(12) United States Patent
Lee et al.

(10) Patent No.: US 7,532,916 B2
(45) Date of Patent: May 12, 2009

(54) SLIDE-TYPE PORTABLE TERMINAL USING FLEXIBLE MATERIAL

(75) Inventors: Chang-Soo Lee, Incheon (KR); In-Gon Park, Seoul (KR); Won Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 457 days.

(21) Appl. No.: 11/496,816

(22) Filed: Aug. 1, 2006

(65) Prior Publication Data

US 2007/0032105 A1 Feb. 8, 2007

(30) Foreign Application Priority Data

Aug. 5, 2005 (KR) ................ 10-2005-0071970

(51) Int. Cl.
*H04M 1/00* (2006.01)

(52) U.S. Cl. ............... 455/575.4; 455/90.3; 455/575.1; 455/575.3; 379/433.13

(58) Field of Classification Search .............. 455/575.4, 455/575.1, 575.3, 90.3, 550.1; 379/433.12, 379/433.13, 433.1; 345/168; 361/679, 681
See application file for complete search history.

(56) References Cited

U.S. PATENT DOCUMENTS

| 7,016,712 B2 * | 3/2006 | Newman et al. | 455/575.3 |
| 7,082,196 B2 * | 7/2006 | Kauhaniemi et al. | 379/447 |
| 7,158,634 B2 * | 1/2007 | Eromaki | 379/433.13 |
| 2006/0198513 A1 * | 9/2006 | Eldon | 379/433.13 |

* cited by examiner

*Primary Examiner*—Pablo N Tran
(74) *Attorney, Agent, or Firm*—The Farrell Law Firm, PC

(57) ABSTRACT

Disclosed is a portable terminal using a flexible material. The portable terminal includes an upper portion, a lower portion and a flexible portion integrally connecting the upper and lower portions. The portable terminal is of a slide-type in which after the upper portion is bent about the flexible portion, the upper portion is slid in the lengthwise direction of the lower portion to open/close a predetermined area of the lower portion.

10 Claims, 6 Drawing Sheets

SLIDE-TYPE PORTABLE TERMINAL USING FLEXIBLE MATERIAL

PRIORITY

This application claims priority to an application entitled "SLIDE-TYPE PORTABLE TERMINAL USING FLEXIBLE MATERIAL" filed with the Korean Intellectual Property Office on Aug. 5, 2005 and assigned Serial No. 2005-71970, the contents of which are incorporated herein by reference.

BACKGROUND OF THE INVENTION

1. Field of the Invention

The present invention relates to a DMB (Digital Media Broadcast) phone, a game phone, a chatting phone, a camera phone, an MP3 phone, a cellular phone, a PCS (Personal Communications Service), a PDA (Personal Digital Assistants), an HHP (Hand Held Phone), and the like, and more particularly to a slide-type portable terminal using a flexible material.

2. Description of the Related Art

In general, a "portable terminal" refers to an electronic device that a user can carry to perform wireless communication with a desired partner. To facilitate portability, designs of such portable terminals tend not only to be compact, slim, and light, but are also moving toward providing multimedia capability and a wider variety of functions. In particular, future portable terminals are expected to incorporate greater multi-functionality and multi-purpose utility, as well as being more compact and light weight and having the capability of modification to suit various multimedia or Internet environments. Additionally, portable terminals are now commonly used by people of all ages and all walks of life throughout the world, and are recognized by some people as a nearly indispensable commodity.

Portable terminals may be classified into various categories according to their appearance, such as a bar-type portable terminal, a flip-type portable terminal and a folder-type portable terminal. A bar-type portable terminal refers to a device having a single housing of a bar-shape. A flip-type portable terminal refers to a device in which a flip is rotatably mounted to a housing by a hinge unit. A folder-type communication device refers to the manner in which a folder is rotatably connected to a single bar-type housing by a hinge unit.

Portable terminals may also be classified into a necklace-type portable terminal and a bracelet-type portable terminal according to the wearing position or the manner in which users wear the portable terminals. The necklace-type portable terminal refers to a portable manner in which a terminal is worn around a neck of a user by using a string. Further, the bracelet-type portable terminal refers to a portable manner in which a terminal is worn around a wrist of a user.

In addition, portable terminals may be classified into a rotation-type portable terminal and a slide-type communication device according to the manner in which the portable terminal is opened and closed. The rotation-type portable terminal refers to a manner in which two housings are rotatably connected, opposed to each other. The slide-type communication device refers to a manner in which two housings are slid with respect to each other in the lengthwise direction of the device. These variously classified portable terminals can be easily understood by those skilled in the art.

Meanwhile, conventional portable terminals now tend to transmit data at a high speed in addition to performing the basic voice communication function. In other words, according to the increase in consumer demand, portable terminals now tend to provide a service using a wireless communication technology capable of transmitting data at high speed.

Recent portable terminals also tend to be equipped with a camera lens to obtain video signals for transmission. Particularly, current portable terminals have an external or embedded camera lens module which enables users to perform video communication with desired partners or to photograph desired subjects.

However, slide-type portable terminals have generated the following problems. According to a slide-type portable device disclosed in Korean Patent Application No. 2002-71911, which is commonly assigned to the assignee of the present application, since two housings are slidably connected by a slide module, the manufacturing cost is increased, and the assembling convenience and the productivity are decreased due to the complex structure and the increase in the number of parts. Further, since the slide-type portable device requires much mounting space for the slide module, it is disadvantageous to try to make the terminal thin and small-sized. Further, according to the slide-type portable terminal, since a flexible circuit is used to electrically connect the two housings, shorts of the flexible circuit are often generated due to the repetitive opening/closing operations.

Specifically, since the conventional folder-type portable terminal includes a body, a folder and a hinge module connecting the body and the folder, the hinge module should be mounted. Therefore, the structure is complex, the number of parts increases and the assembling convenience decreases, thereby increasing the manufacturing cost of the folder-type portable terminal. Since the folder-type portable terminal uses a flexible circuit to electrically connect the body and the folder and the flexible circuit should pass through a hinge axis, shorts of the flexible circuit are often generated due to the repetitive opening/closing operations.

SUMMARY OF THE INVENTION

Accordingly, the present invention has been made to solve the above-mentioned problems occurring in the prior art, and an object of the present invention is to provide a portable terminal in which the structure is simple and the manufacturing cost is low.

Another object of the present invention is to provide a portable terminal which can be used in slide-type by including a flexible portion.

Another object of the present invention is to provide a portable terminal which does not need a slide module when used as a slide-type.

Another object of the present invention is to provide a portable terminal which can be easily assembled since it does not need a slide module.

Another object of the present invention is to provide a portable terminal which has good texture by forming the outer casing thereof with a flexible material.

Another object of the present invention is to provide a portable terminal which has the advantages of a reduced manufacturing cost and number of parts, an improved assembling convenience and a thinner and smaller size.

Another object of the present invention is to provide a portable terminal in which the drop damage is minimized by absorbing the impact generated when the terminal is dropped.

Another object of the present invention is to provide a portable terminal in which the display unit is inclined such that a user can see the displayed data conveniently.

Another object of the present invention is to provide a portable terminal in which the receiver thereof is inclined to maintain a facile talk angle when the case is in a slide-up position.

Another object of the present invention is to provide a portable terminal which is convenient to carry since the body thereof is linearly formed.

In order to accomplish these objects, there is provided a portable terminal which includes an upper portion; a lower portion; and a flexible portion integrally connecting the upper and lower portions, wherein the portable terminal is of the slide-type in which after the upper portion is bent about the flexible portion, the upper portion is slid in the lengthwise direction of the lower portion to open/close a predetermined area of the lower portion.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Figure 1:
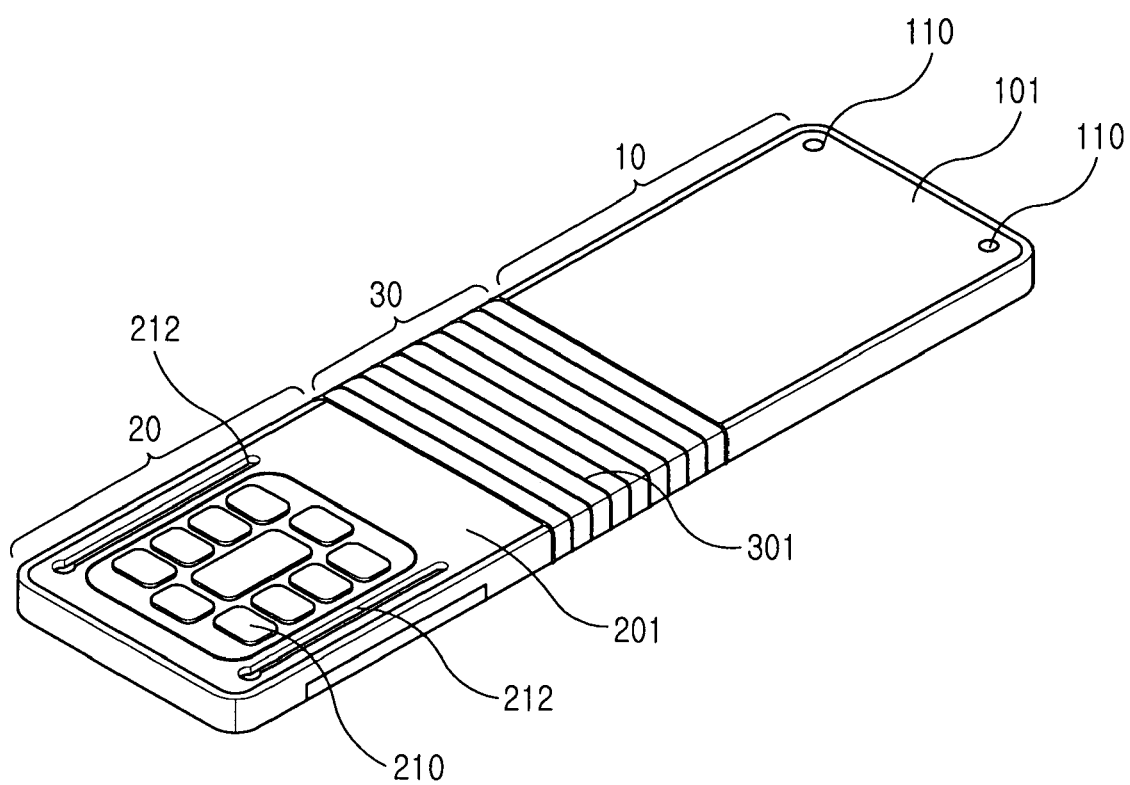
FIG. 1 is a perspective view for showing a portable terminal according to the present invention in an unfolded position.
Figure 2:
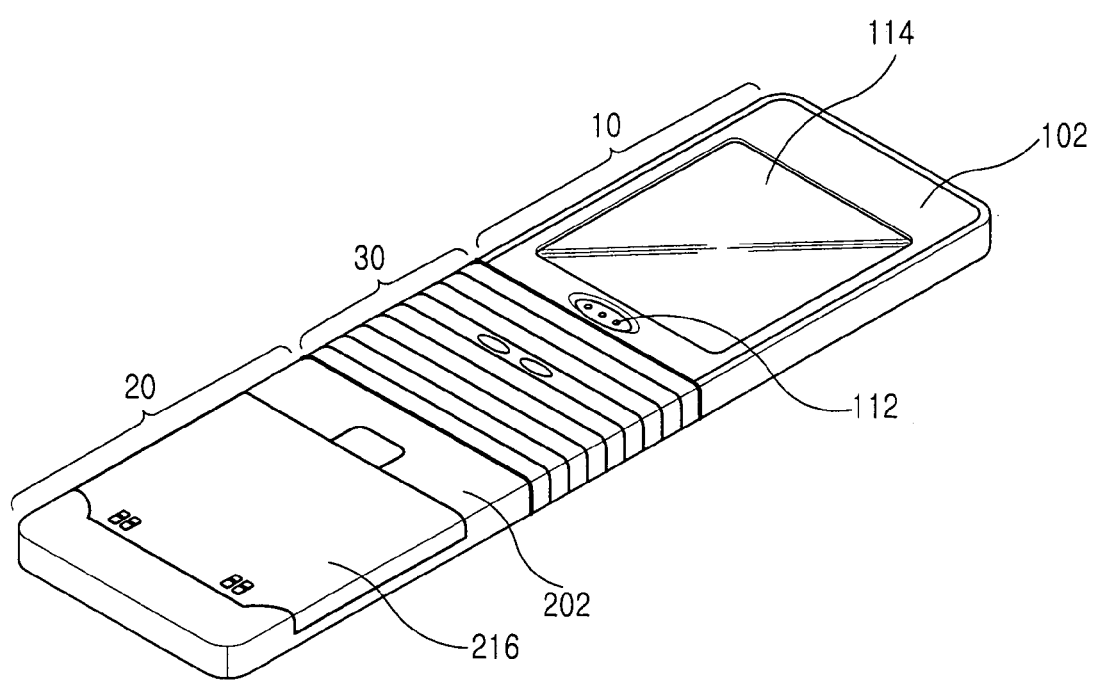
FIG. 2 is a perspective view for showing the bottom portion of a portable terminal according to the present invention.
Figure 3:
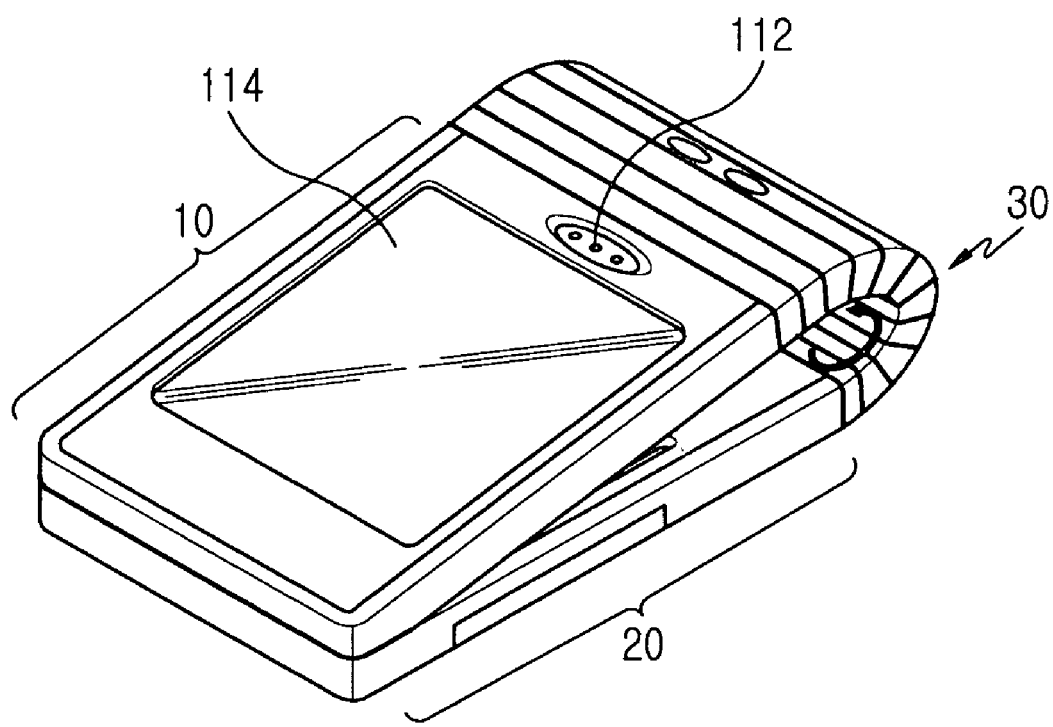
FIG. 3 is a perspective view for showing a portable terminal according to the present invention in a folded position.
Figure 4:
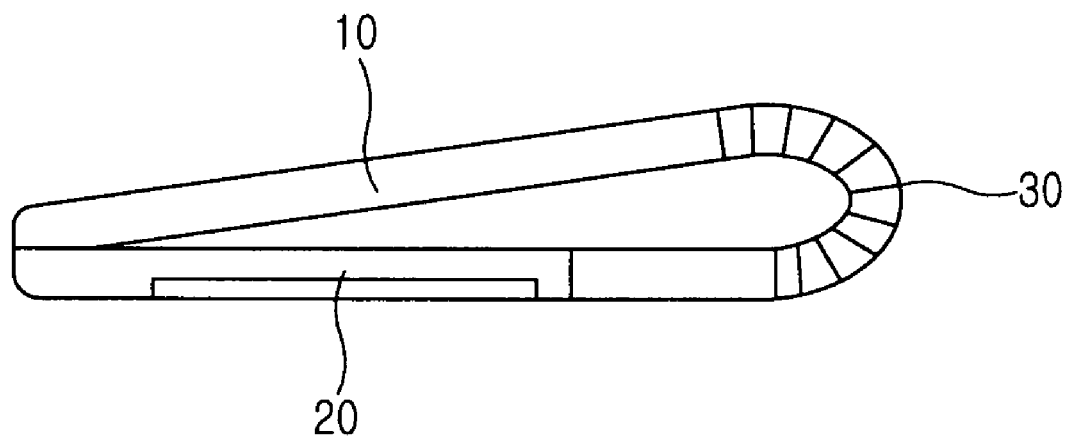
FIG. 4 is a side view of FIG. 3.
Figure 5:
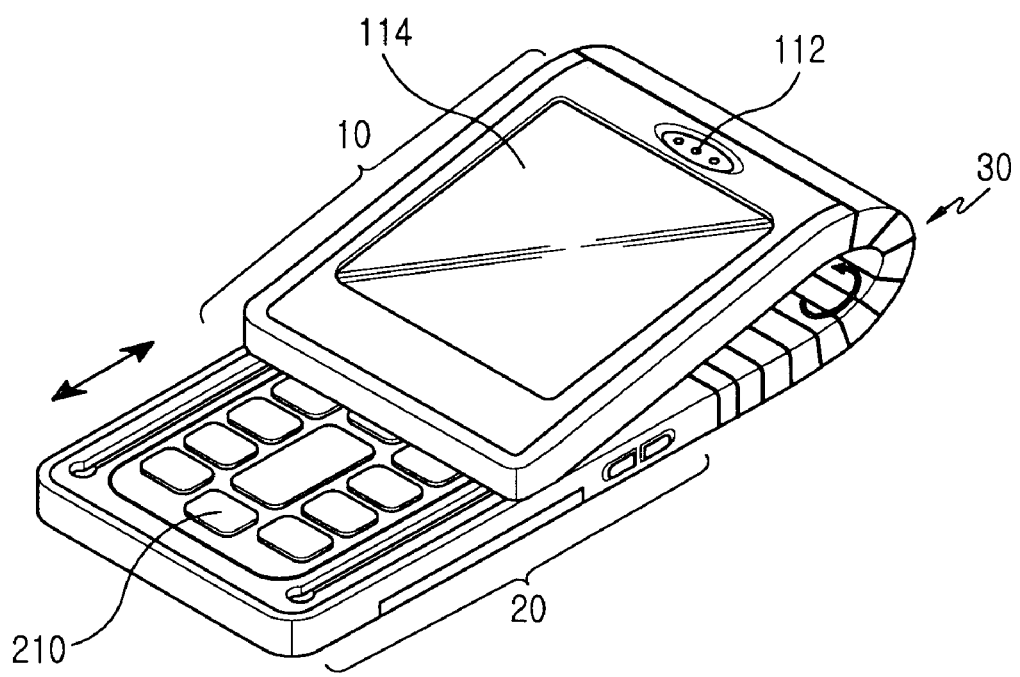
FIG. 5 is a perspective view of a portable terminal according to the present invention which is used in the slide-type position after being folded.
Figure 6:
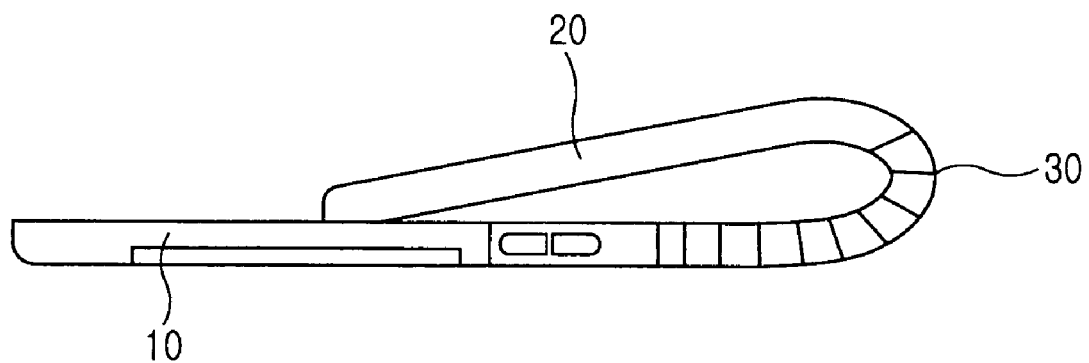
FIG. 6 is a side view of FIG. 5.

As shown in FIGS. 1 and 2, a portable terminal according to the present invention includes an upper portion 10, a lower portion 20 and a flexible portion 30 integrally connecting the upper portion 10 and the lower portion 20. The upper and lower portions 10 and 20 are linearly connected to each other by the flexible portion 30. This state is shown in FIGS. 1 and 2. since the flexible portion 30 includes a plurality of wrinkle portions 301 and can be bent or folded, the upper portion 10 can be bent or folded about the flexible portion 30 and can be slid on the lower portion 20 in the lengthwise direction of the lower portion 20. The wrinkle portions are formed in the same direction as the rotation axis about which the flexible portion 30 is bent or folded. A display unit 114 is disposed on the bottom surface 102 of the upper portion 10. A key pad including a plurality of keys is disposed on the upper surface 201 of the lower portion 20 and a battery pack 216 is disposed on the bottom surface of the lower portion 20. Further, a receiver 112 is located at a predetermined position of the bottom surface of the upper portion 10. The receiver 112 is disposed between the display unit 114 and the flexible portion 30.

The portable terminal according to the present invention further includes a slide guiding means which helps the slide of the upper portion 10 when the upper portion 10 is slid on the upper surface 201 of the lower portion 20 after the upper portion 10 is folded. The slide guiding means includes at least one groove-shaped guide rail 212 formed on the upper surface 201 of the lower portion 20 and a slide boss 110 provided on the upper surface 101 of the upper portion 10 to be slid on the guide rail 212. However, the guide rail can be formed on the upper surface of the upper portion and the slide boss can be formed on the upper surface of the lower portion. The guide rail 212 and the slide boss 110 constitutes a pair and the guide rail 212 is linearly provided.

As shown in FIGS. 3 to 6, the upper portion 10 is slid on the lower portion 20 after being bent about the flexible portion 30. In particular, the upper portion 10 is slid on the lower portion 20, with the upper portion 10 opposed to the key pad 210 installed on the upper surface of the lower portion 20 to close or completely open the key pad 212.

As shown in FIGS. 3 to 6, according to the portable terminal of the present invention, after the upper portion 10 is bent or completely folded about the flexible portion 30 toward the lower portion 20, it can be used in a slide position in which it is slid in the lengthwise direction of the lower portion 20 to open/close a predetermined area of the lower portion 20.

The flexible portion 30 electrically and mechanically connects the upper and lower portions 10 and 20 and is in charge of the hinge function of the upper portion 10. As a flexible circuit (not shown) passes through the flexible portion 30, the display unit 114 of the upper portion 10 is electrically connected to a printed circuit board (not shown) of the lower portion 20. Since the flexible portion is made of rubber or silicon, the texture is optimized and the drop damage is minimized as it absorbs the impact generated when the terminal is dropped.

Further, the upper and lower portions 10 and 20 can be made of the same material as the flexible portion 30 to provide optimal texture or can be made of a different material from the flexible portion 30. The flexible portion 30 can be made such that it is bent only by an external force or is smoothly bent even without any external force.

When the upper portion 10 is bent or folded, the display unit 114 is inclined such that a user can see the displayed data conveniently. Further, if the upper portion 10 is slid up, the receiver 112 is located so as to be inclined to maintain an angle at which talking is easy.

The display unit 114 can be made of a hard LCD or a flexible material of a film shape. Particularly, if the display unit 114 is made of a flexible material of a film shape and the keys 210 are of a thin-type and the battery pack 216 is also of a thin-type of a film shape, the upper and lower portions 10 and 20 can be of a thin-type. This construction has advantages in that the portable terminal is convenient to carry in both the unfolded and bent states, is favorably constructed in a thin fashion and has a strong resistance to damage when dropped.

Although not shown in the figures, the portable terminal can be used as a folder-type if the upper portion is folded about the flexible portion, and the folded state of the upper and lower portions can be fixed or released. As mentioned above, according to the present invention, the structure is simple, the manufacturing cost is low and the portable terminal is conveniently used in the slide-type position. Further, the present invention is advantageous in reducing the manufacturing cost, improving the assembling convenience and making the portable terminal thin and small. Especially, the display unit is inclined such that a user can see the screen conveniently. Further, in the slide-up state, the receiver is located so as to be inclined to provide a favorable talk angle. Moreover, since the body is linear, the portable terminal is convenient to carry.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable terminal comprising:
   an upper portion;
   a lower portion; and
   a flexible portion integrally connecting the upper and lower portions,
   wherein the portable terminal is of a slide-type in which after the upper portion is bent about the flexible portion, the upper portion is slid in a lengthwise direction of the lower portion to open or close a predetermined area of the lower portion.

2. A portable terminal according to claim 1, wherein the flexible portion comprises a plurality of wrinkle portions.

3. A portable terminal according to claim 1, wherein the upper portion comprises a display unit, the lower portion comprises a keypad having a plurality of keys, the display unit is disposed on a lower surface of the upper portion, and the keypad is disposed on an upper surface of the lower portion.

4. A portable terminal according to claim 1, further comprising a slide guiding means for assisting sliding movement of the upper portion.

5. A portable terminal according to claim 4, wherein the slide guiding means comprises at least one groove-shaped guide rail formed on an upper surface of the lower portion; and a slide boss provided on an upper surface of the upper portion to slide on the guide rail.

6. A portable terminal according to claim 3, wherein the display unit is inclined when the upper portion is bent toward the lower portion or is slid on the lower portion.

7. A portable terminal according to claim 1, wherein the upper and lower portions are made of an identical material as the flexible portion.

8. A portable terminal according to claim 1, wherein the upper and lower portions are linearly connected by the flexible portion.

9. A portable terminal according to claim 3, wherein a receiver is provided between the display unit and the flexible portion and the receiver is inclined when the upper portion is folded about the flexible portion.

10. A portable terminal according to claim 1, wherein the upper and lower portions are made of a different material from the flexible portion.

* * * * *